United States Patent
Pfertner et al.

(10) Patent No.: US 6,945,595 B2
(45) Date of Patent: Sep. 20, 2005

(54) AIR GUIDING DEVICE

(75) Inventors: Kurt Pfertner, Ditzingen (DE); Gunnar Wilke, Lotte (DE); Timo Czechtizky, Ebersbach-Rosswaelden (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/727,990

(22) Filed: Dec. 5, 2003

(65) Prior Publication Data

US 2004/0164592 A1 Aug. 26, 2004

(30) Foreign Application Priority Data

Dec. 5, 2002 (DE) .......................... 102 56 753

(51) Int. Cl.[7] ................................. B60J 7/22
(52) U.S. Cl. ...................................... 296/217
(58) Field of Search .......................... 296/217

(56) References Cited

U.S. PATENT DOCUMENTS

| 3,156,175 | A | * | 11/1964 | Werner | 296/217 |
| 5,660,429 | A | * | 8/1997 | Wienchol | 296/217 |
| 6,234,567 | B1 | * | 5/2001 | Melchger | 296/180.1 |

FOREIGN PATENT DOCUMENTS

| DE | 37 41 131 C1 | 2/1989 |
| DE | 39 25 808 A1 | 2/1991 |
| DE | 41 26 568 C2 | 8/1993 |
| DE | 44 48 016 C1 | 1/1996 |
| DE | 198 53 358 A1 | 5/2000 |
| EP | 0 374 421 B1 | 6/1990 |
| EP | 0 716 948 A1 | 6/1996 |

* cited by examiner

Primary Examiner—Dennis H. Pedder
(74) Attorney, Agent, or Firm—Crowell & Moring LLP

(57) ABSTRACT

An air guiding device for a vehicle sliding roof is arranged on a draft deflector and comprises essentially a holding section as well as an adjoining wing which protrudes to the outside in an operative position and is bent in an inoperative position. The holding section of the air guiding element is clampingly held in a transverse slot of the draft deflector.

12 Claims, 3 Drawing Sheets

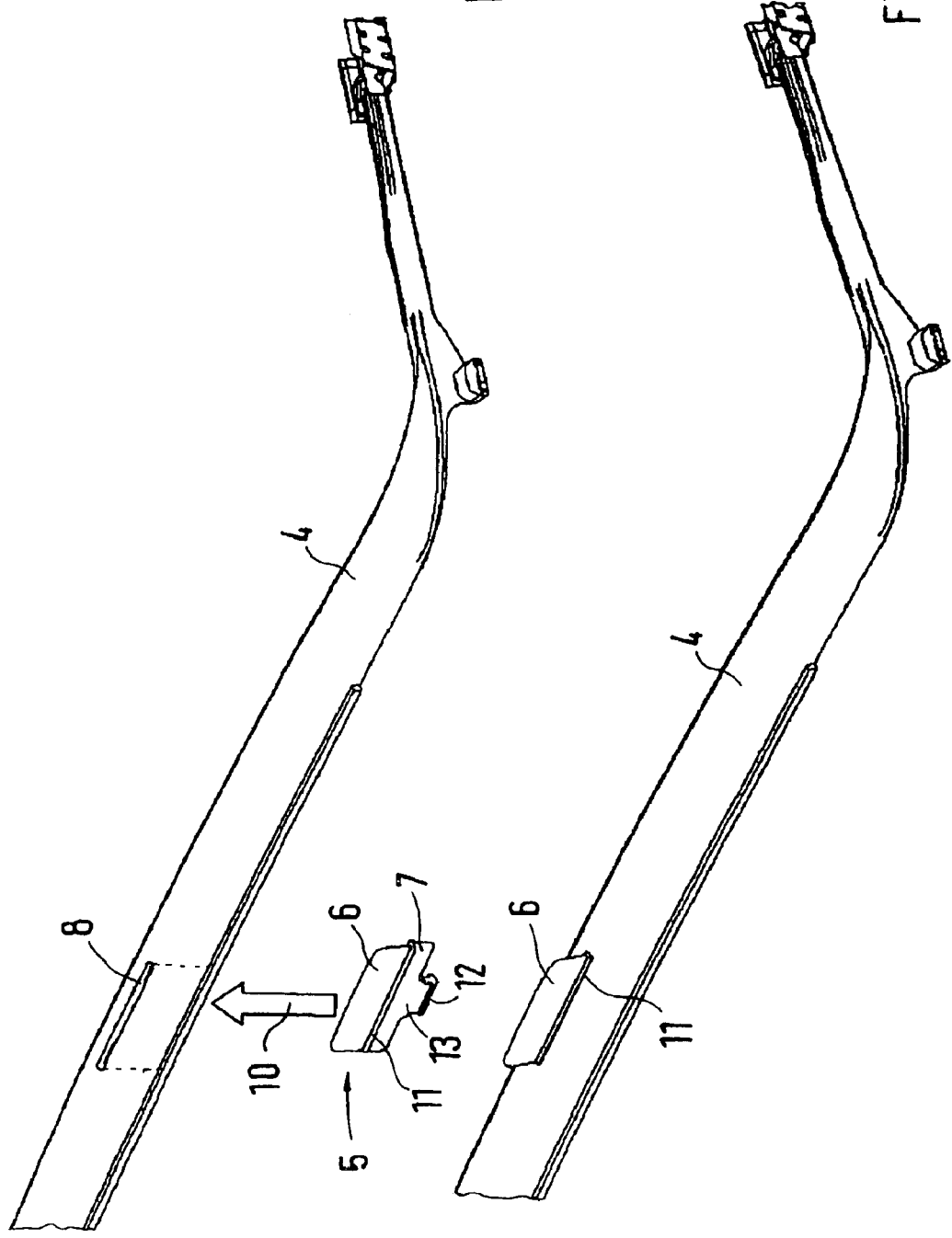

US 6,945,595 B2

AIR GUIDING DEVICE

BACKGROUND AND SUMMARY OF THE INVENTION

This application claims the priority of German Application No. DE 102 56 753.0 filed Dec. 5, 2002, the disclosure of which is expressly incorporated by reference herein.

The invention relates to an air guiding device on a draft deflector of a motor vehicle which is equipped with a sliding roof or the like and which comprises an air guiding element which, in an operative position, projects beyond the draft deflector in a raised manner.

From European Patent Document EP 0 374 421 B1 (corresponding U.S. Pat. No. 5,052,745), a draft deflector for a sliding roof is known on which an air guiding element is arranged which, in an operative position, projects over the draft deflector and, in an inoperative position, is arranged below the sliding roof. The air guiding element is swivellably held on the draft deflector either by way of a stationary swivelling shaft or an elastic shaft, for the purpose of which the air guiding element is connected with the draft deflector by means of gluing or molding-on.

It is an object of the invention to create an air guiding device on a draft deflector which can be mounted in a simple manner and, in addition, is elastically adjustable into an operative and into an inoperative position.

This object is achieved according to certain preferred embodiments of the invention by providing an air guiding device on a draft deflector for a motor vehicle which is equipped with a sliding roof or the like and which comprises an air guiding element which, in an operative position, projects beyond the draft deflector in a raised manner, wherein the air guiding element comprises a holding section with at least one adjoining elastic wing, the holding section being held in use in a clamped-in manner in a transverse slot of the draft deflector, the wing extending out of the slot above the draft deflector in an approximately vertical plane, when an operative position, the wing being arranged in an elastically bent manner below the sliding roof when in an inoperative position.

Additional advantageous features of preferred embodiments of the invention are described herein and in the claims.

Important advantages achieved by means of certain preferred embodiments of the invention are that the air guiding element can easily be mounted in a transverse slot of the draft deflector and can easily be exchanged. For this purpose, the air guiding element has a holding section with at least one adjoining elastic wing. The holding section is held in a clamped-in manner in a transverse slot of the draft deflector and, in the operative position, the wing extends out of the slot and is arranged above the draft deflector. In an inoperative position, the wing is elastically bent away and arranged below the sliding roof.

According to certain preferred embodiments of the invention, the air guiding element is slid from below into the transverse slot of the draft deflector and is clamped in because of its slightly larger thickness with respect to the smaller width of the transverse slot. As a result, the air guiding element is fixedly and stationarily held in its inoperative position and in its possible operative positions.

According to certain preferred embodiments of the invention, the transverse slot is provided in an existing interior web of the draft deflector and penetrates the latter on a section. For this purpose, the draft deflector consists of a profiled element which, in a transversely extending interior web, has the continuous transverse slot of the same width which is arranged in the longitudinal center plane of the vehicle.

So that the wing of the air guiding element cannot be pressed into the transverse slot and dive away, the holding section of the wing has a larger thickness than the adjoining wing and is offset with respect to the latter by a surrounding edge according to certain preferred embodiments of the invention. This surrounding edge of the wing is constructed as a sealing and holding element with respect to the transverse slot. The edge tightly closes the transverse slot, for example, with respect to water and air from above so that these media cannot enter into the interior of the vehicle.

According to certain preferred embodiments of the invention, the surrounding edge separates the holding section from the actual wing of the air guiding element so that an elastic bending edge can form adjacent to the edge such that an elastic bending edge forms between the surrounding edge and the adjoining wing in such a manner that, by an action upon the sliding roof, the wing has an inoperative position bent in the driving direction around the bending edge and, in the operative position, has a vertical position and, during high wind load stress, has a load position bent around the bending edge against the driving direction.

According to certain preferred embodiments of the invention, the air guiding element can always be positioned in a precise manner and cannot be pushed into the transverse slot uncontrolled, the holding section has a boundary bead at the end side, which boundary bead can, for example, also be provided on a tongue shaped onto the holding section. This boundary section has a larger width than the transverse slot.

According to certain preferred embodiments of the invention, for ensuring a constant position of the air guiding element in the transverse slot of the draft deflector, the bead of the holding element in an inoperative position is supported on an elevation of the roof frame so that, in this position, the air guiding element can necessarily be positioned in a precise manner.

According to certain preferred embodiments of the invention, as a result of the erected air guiding element in the operative position, a so-called rumbling in the vehicle interior is avoided which is caused by air vibrations generated by an air flow guided over the vehicle roof.

Other objects, advantages and novel features of the present invention will become apparent from the following detailed description of the invention when considered in conjunction with the accompanying drawings.

BRIEF DESCRIPTION OF THE DRAWINGS

FIG. 2 is a view of the draft deflector of FIG. 1 with a transverse slot and depicting mounting of an air guiding element, constructed according to certain preferred embodiments of the present invention;

FIG. 3 is a view of the draft deflector of FIG. 2 with an installed air guiding element;

DETAILED DESCRIPTION OF THE DRAWINGS

Figure 1:
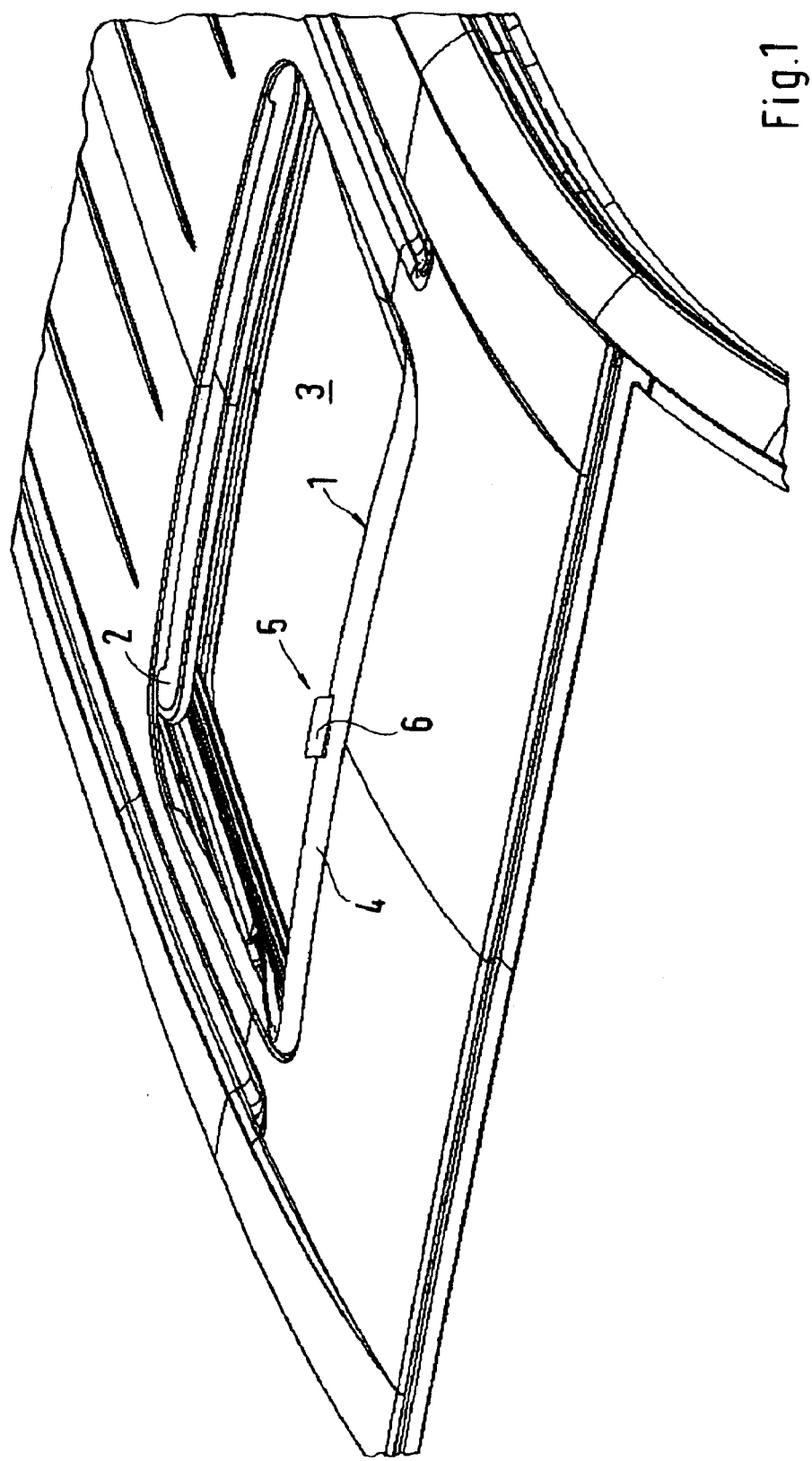
FIG. 1 is a diagrammatic representation of a vehicle with a sliding roof, a draft deflector and an air guiding element, constructed according to certain preferred embodiments of the present invention.

As illustrated in detail in FIG. 1, an air guiding element 5 is arranged in an erected draft deflector 4, on a forward cutout 1 of a roof opening 3 opened by way of a sliding roof 2, an upright wing 6 of the air guiding element 5 being visible. This wing 6 is arranged in the longitudinal center plane of the vehicle but may repeatedly be provided in the draft deflector 4 according to other contemplated embodiments of the invention.

The draft deflector 4 is linked to the vehicle roof and is erected when the sliding roof 2 is open and is swung downward when the sliding roof 2 is closed.

The air guiding element 5 comprises a holding section 7 and an adjoining elastic wing 6. For a fixing in the draft deflector 4, the latter has a transversely oriented slot 8 in which the holding section 7 is received. The slot 8 is dimensioned such that the holding section 7 is received in a clamping manner; that is, it has a slightly thicker construction than the width of the transverse slot 8.

The slot 8 is arranged such in an interior web 9 of the draft deflector 4 consisting of a profile that the air guiding element 5 is inserted from the bottom in the direction of the arrow 10. In order to prevent a sliding of the air guiding element 5 back in the slot 8, the air guiding element 5 has a surrounding, protruding edge 11 between the wing 6 and the holding section 7, which edge 11 covers the opening of the slot 8 from above.

A boundary bead 12 is provided on the end side of the holding section 7, which boundary bead 12 is arranged on a tongue 13 projecting downward from the holding section 7. This bead 12 limits the slid-in position of the air guiding element 5 in the slot 8, and the air guiding element 5 is simultaneously held in position when the sliding roof 2 is closed in that the boundary bead 12 is supported on an elevation 14 of the roof frame 15.

By means of the surrounding edge 11, the air guiding element 5 is divided into the wing 6 and into the holding section 7, the wing 6 having a thinner construction than the holding section 7. The wing 6 preferably consists of an elastic material and is bendable adjacent to the surrounding edge 11.

Figure 4:
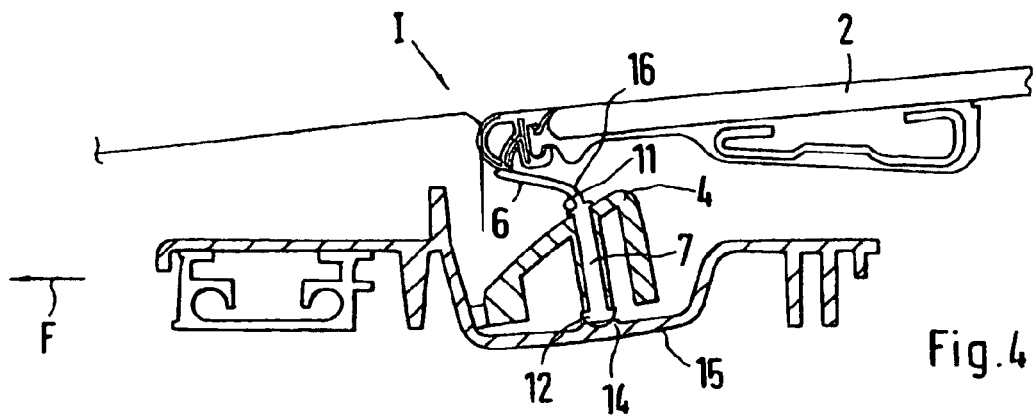
FIG. 4 is a vertical sectional view of the sliding roof with the draft deflector and the air guiding element of FIGS. 2 and 3, as well as the roof frame shown in an air guiding element inoperative position.
Figure 5:
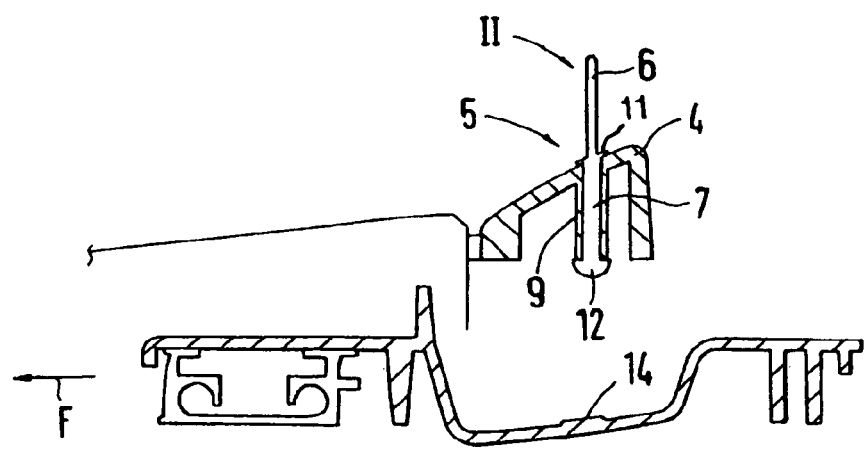
FIG. 5 is a vertical sectional view of the draft deflector and the air guiding element of FIG. 4 shown in an air guiding element operative position.
Figure 6:
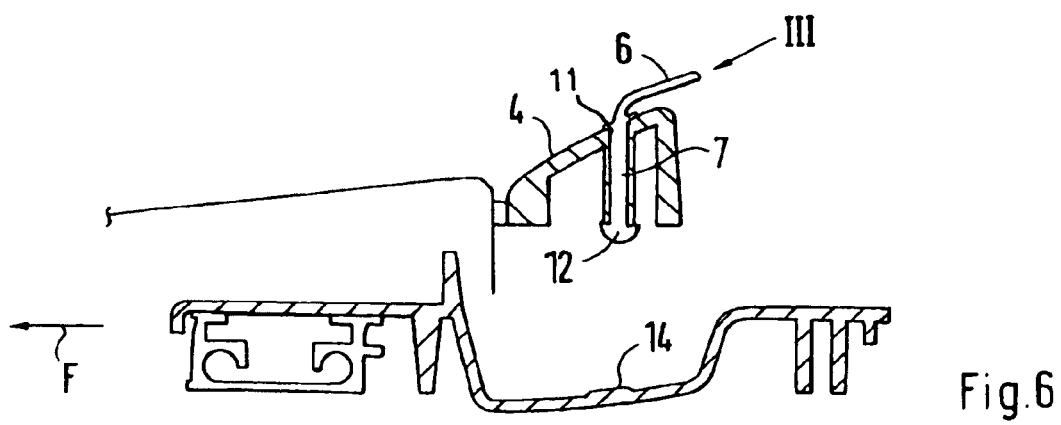
FIG. 6 is a vertical sectional view of the draft deflector with the air guiding element of FIG. 4, shown in an additional air guiding element operative position.

FIGS. 4 to 6 show the possible methods of operation of the air guiding element 5 in detail. Thus, FIG. 4 shows the air guiding element 5 in an inoperative position I when the sliding roof 2 is closed. In this position I, the draft deflector 4 is lowered into the roof frame 15 and, by influencing the sliding roof 2, the air guiding element 5 is bent toward the front in the driving direction F around a bending edge 16 adjacent to the edge 11.

FIG. 5 shows the air guiding element 5 in its operative position II, in which the wing 6 projects vertically beyond the swung-out draft deflector 4.

In FIG. 6, the air guiding element 5 is illustrated in another possible operative position III, in which, as a result of an air flow, the wing 6 is bent away toward the rear against the driving direction F. When the air flow diminishes, the wing 6 rises correspondingly and takes up a position at a different angle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air guiding device on a draft deflector for a motor vehicle which is equipped with a movable roof and which comprises an air guiding element which, in an operative position, projects beyond the draft deflector in a raised manner, wherein the air guiding element comprises a holding section with at least one adjoining elastic wing, the holding section being held in use in a clamped-in manner in a transverse slot of the draft deflector, the wing extending out of the slot above the draft deflector in an approximately vertical plane, when in an operative position, the wing being arranged in an elastically bent manner below the movable roof when in an operative position, wherein the draft deflector consists of a profiled element which, in a transversely extending interior web, has the transverse slot which is arranged in a longitudinal center plane of the vehicle.

2. Air guiding device according to claim 1, wherein the holding section of the wing has a greater thickness than the adjoining wing and is offset with respect to the latter by way of a surrounding edge.

3. Air guiding device according to claim 2, wherein the surrounding edge of the wing is constructed as a sealing and holding element with respect to the transverse slot.

4. Air guiding device according to claim 3, wherein an elastic bending edge is formed between the surrounding edge and the adjoining wing such that, by an action upon the sliding roof, the wing has an inoperative position bent in a driving direction around the bending edge and in the operative position has a vertical position, and, during high wind load stress, has a load position bent around the bending edge against the driving direction.

5. Air guiding device according to claim 1, wherein the holding section has an end-side boundary bead which is situated in a center area of the holding section extending as a tongue.

6. Air guiding device on a draft deflector for a motor vehicle which is equipped with a movable roof and which comprises an air guiding element which, in an operative position, projects beyond the draft deflector in a raised manner, wherein the air guiding element comprises a holding section with at least one adjoining elastic wing, the holding section being held in use in a clamped-in manner in a transverse slot of the draft deflector, the wing extending out of the slot above the draft deflector in an approximately vertical plane, when in an operative position, the wing being arranged in an elastically bent manner below the movable roof when in an operative position, wherein the holding section has an end-side boundary bead which is situated in a center area of the holding section extending as a tongue, and wherein, in an operative position of the air guiding element, the boundary bead is supported on an end side on an elevation of a roof frame of the vehicle.

7. An air guiding element which in use is supported at a draft deflector of a vehicle sliding roof, which has a transversely extending interior web, said air guiding element including:
- a holding section which in use is clampingly held in a slot in the interior web of the draft deflector, and
- an elastic wing section adjoining the holding section and configured to extend out of the slot above the draft deflector when in an operative position and to be elastically bent by engagement with a sliding roof member when in an operative position.

8. An air guiding element according to claim 7, wherein the holding section of the wing has a greater thickness than the adjoining wing and is offset with respect to the latter by way of a surrounding edge.

9. An air guiding element according to claim 8, wherein the surrounding edge of the wing is constructed as a sealing and holding element with respect to the transverse slot.

10. An air guiding element according to claim 8, wherein an elastic bending edge is formed between the surrounding edge and the adjoining wing such that, by an action upon the sliding roof, the wing has an inoperative position bent in a driving direction around the bending edge and in the operative position has a vertical position, and, during high wind load stress, has a load position bent around the bending edge against the driving direction.

11. An air guiding element according to claim 7, wherein the holding section has an end-side boundary bead which is situated in a center area of the holding section extending as a tongue.

12. An air guiding element according to claim 8, wherein the holding section has an end-side boundary bead which is situated in a center area of the holding section extending as a tongue.

* * * * *